Dec. 29, 1953     W. J. F. O'CONNOR ET AL     2,664,245

HEATER CONTROL

Filed March 11, 1949     2 Sheets-Sheet 1

INVENTORS
Ward J. F. O'Connor &
Frank A. Rowen, Jr.
BY Nathaniel Ely
ATTORNEY

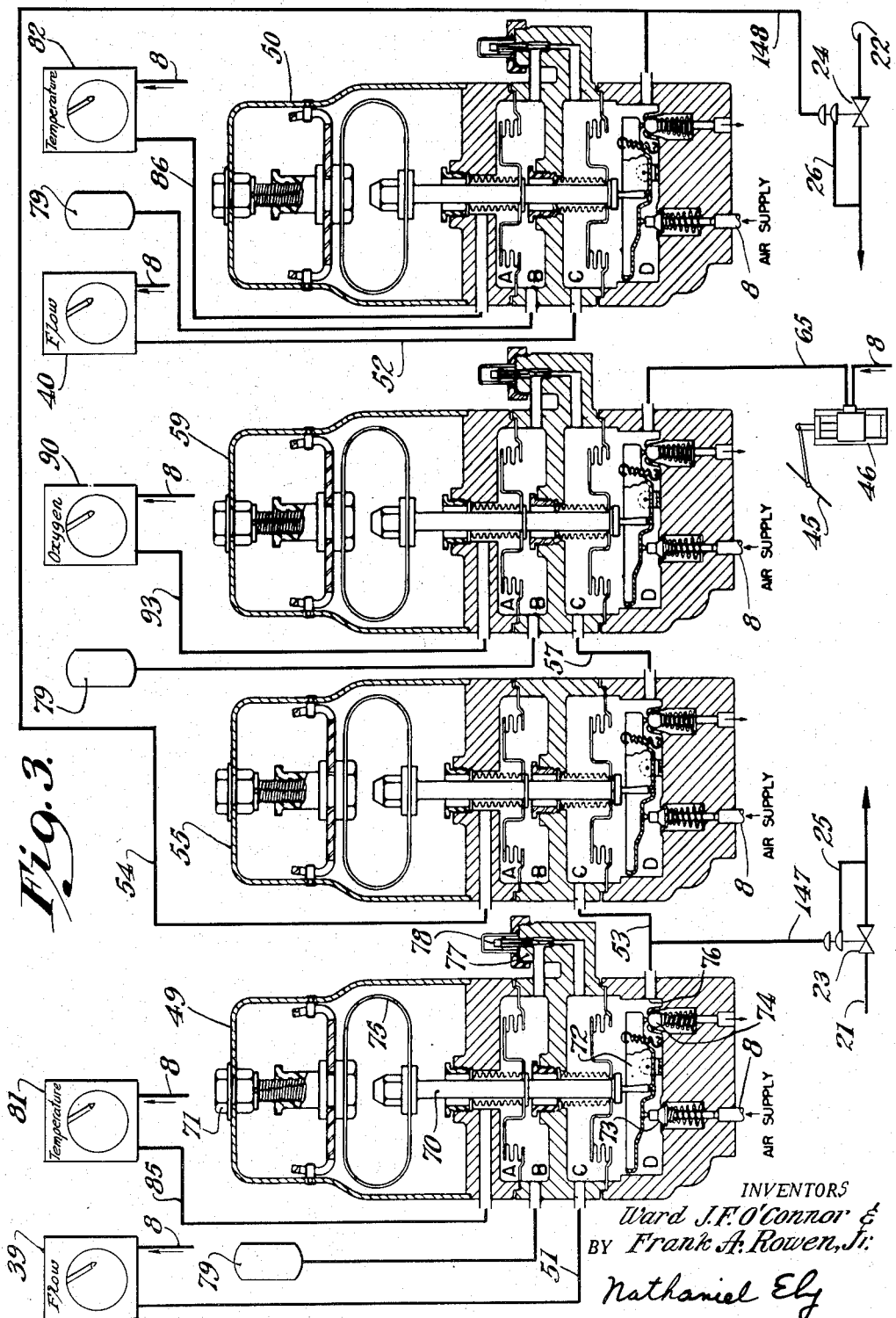

Patented Dec. 29, 1953

2,664,245

UNITED STATES PATENT OFFICE 2,664,245

HEATER CONTROL

Ward J. F. O'Connor and Frank A. Rowen, Jr., Bayonne, N. J., assignors to The Lummus Company, New York, N. Y., a corporation of Delaware Application March 11, 1949, Serial No. 80,852

4 Claims. (Cl. 236—14)

This invention relates to the pyrolytic conversion of hydrocarbons in which the hydrocarbon charge is passed through the conversion apparatus in an attenuated stream under conditions of temperature and pressure suitable to perform cracking. More particularly, the invention is concerned with automatic control of the combustion in refinery heaters employed in such conversion, and to an arrangement whereby continuous automatic correlation is maintained between the rate of flow of the entering charge of hydrocarbons, the temperature of the outgoing conversion products, the fuel flow and the oxygen content of the products of combustion in such manner as to accomplish maximum fuel conservation and uniform process control.

It has long been recognized that for efficient and economical operation of refinery heaters it is essential that the combustion be accurately controlled so as to maintain the most economical ratio between the rate of flow of the incoming charge and the rate of fuel flow into the heater, always assuming the maintenance of the desired temperature of the outgoing conversion products. While the existence of the fuel flow control problem has long been recognized, its solution in the form of automatic control of chemical processing equipment has never, so far as the applicants are advised, been attained until the present time. In such equipment, it is not only necessary to maintain generally uniform conditions but, due to the large quantities of materials handled, it is essential that changes be anticipated to prevent "hunting" or over-correction. Our invention is thus largely one relating to supplemental control of primary controls whereby transient corrections may be made, such transient corrections tending to fade away under certain conditions to avoid over-actuation of a primary control.

The principal feature of our invention is the provision of standard forms of multiple chamber relays which are appropriately connected to variable condition sensing devices in such a manner that certain changes of conditions will result in an instantaneous change in the controls whereas certain other variables may have only a partial or temporary effect on the principal control.

As a secondary feature of our invention, we contemplate the use of an oxygen analysis and recording controller which will efficiently control the combustion air in the combustion chamber.

Further objects and advantages of our invention will appear from the following description of a preferred form of embodiment thereof taken in connection with the attached drawing illustrative thereof, in which:

Fig. 3 is a schematic outline of one embodiment of the control diagram.

Figure 1:
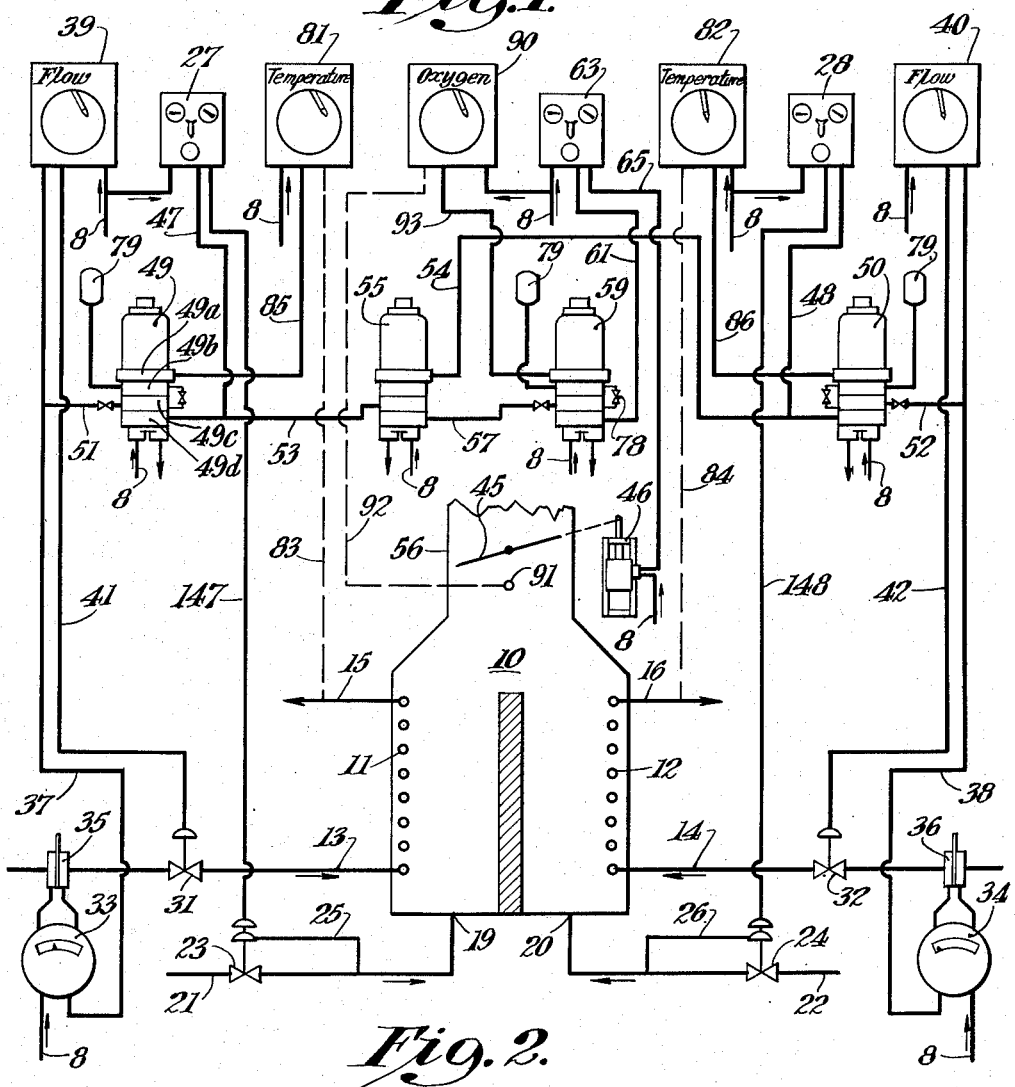
Figure 1 is a schematic control diagram for a multiple coil heater.

In accordance with our invention, the multiple coil petroleum heater indicated at 10 has the separate heating coils 11 and 12 to which the charge inlet streams 13 and 14 are separately connected. The discharge of said streams is at 15 and 16 respectively. They are generally heated in a common furnace although there are individual rows of fuel burners 19 and 20 which in turn are supplied with fuel from lines 21 and 22 respectively. Fuel line 21 has a valve 23 of the double diaphragm control type, the lower diaphragm being directly affected by the upstream fuel pressure through line 25. This provides a normal uniform flow of fuel. In a similar manner, fuel line 22 is controlled by valve 24, which in turn is connected through line 26 with the upstream fuel pressure.

Charge flow control is maintained through charge flow valves 31 and 32 on the respective lines 13 and 14 and to maintain automatic control, flow transmitters 33 and 34 are connected across customary orifice units 35 and 36 respectively. Generally, the transmitter 33 supplied by air from a common source 8 is connected through line 37 with a charge flow control recording meter 39, and thence through line 41, directly controls flow control valve 31. Similarly, transmitter 34 is connected through line 38 with charge flow control recording meter 40 and thence through line 42, it controls valve 32. This provides uniform charge flow as well as providing a record of the various streams.

Figure 2:
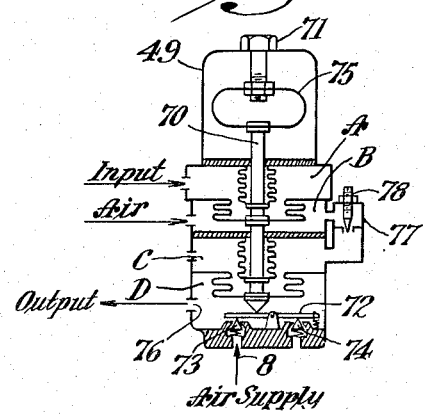
Figure 2 is a schematic detail of a relay valve.

Any variations in the charge flow rate must be reflected in the fuel flow to avoid temperature changes in the outlet which would of course, reflect improper heating. Charge flow conditions of line 13 are in turn reflected in line 37, and through line 51, the derivative relay 49 is affected. The details of a relay of this type are shown in Figure 2 which will be described hereinafter. It is sufficient for the present purpose however, to note that through line 47, the effects are carried through the manual control 27 and thence through line 147, the fuel valve 23 will be controlled.

In a similar manner, the charge flow conditions of line 14 which are reflected in line 38, may be impressed by line 52, through relay 50, and in turn, through line 46, manual controller 28, and line 148, to valve 24. It is of course to be understood that the manual controllers 27 and 28 may be used for temporary manual control, if desired, but ordinarily they merely carry the automatic responses of the relays 49 and 50 to the respective valves.

Any variation in the fuel flow materially affects the efficiency of combustion within the heater 10 and we find that a variation of the position of the heater damper 45, by damper motor 46 should reflect a fuel valve change. This is also accomplished through the operation of derivative relay 49. Changes in fuel valve 23 are also effective on line 53 interconnected with averaging relay 55. This in turn affects line 57 connected with the third derivative relay 59, and in turn through line 61, and manual controller 63, affects the pressure in line 65 connected to the damper motor 46.

In a similar manner, variations in pressure in line 36 which are applied by line 52 to derivative relay 50 are carried through line 54 to averaging relay 55 to effect the position of damper motor 46. However, as the averaging relay 55 is controlled by both fuel flows, it necessarily positions the damper 45 in accordance with any net increase or decrease in the fuel flow. As there is but a single stack 58 for the heater, this is the desired objective.

By reference to Figure 2, the operation of a derivative type relay will be understood. In general, it includes a central valve stem 70 which is adjustably controlled by screw 71, such valve stem passing through four compartments generally indicated A, B, C, and D. Each of these is pressure tight, pressure in A tending to lower the stem; pressure in B tends to raise the stem; pressure in C tends to lower the stem as in A, and pressure in D acts the same as in B, to raise the stem.

When stem 70 moves downwardly it will engage valve control arm 72 which is centrally pivoted. As arranged, the downward movement of stem 70 tends to move the arm 72 into a position to open valve 73 and close bleeder valve 74. When the stem 70 moves upwardly, valve 74 will permit discharge of pressure from chamber D.

Assuming a balanced pressure system with the position of stem 70 being held down by spring 75, the air supply from common source 8 discharges from chamber D through orifice 76. If any change of pressure in chamber A, B, or C is effected, the stem will move either up or down, based on the net effect, and if it moves up, the leakage valve 74 opens to reduce the pressure in chamber D. It will thus be seen that differential effects may be obtained by merely varying the arrangement of connections to the chambers.

In addition, for derivative purposes as hereinafter described, we also provide a by-pass valve 77 between chambers B and C, with an adjustable needle valve 78 to control flow therethrough. Generally, compartment B is provided with a fixed air reservoir 79 as shown in Figure 1.

Referring again to Figure 1, fuel flow is not only a function of charge flow, but it is also primarily a function of charge outlet temperature. Temperature recording controller 81 is thus sensitive through line 83 with the outlet temperature in line 15 and this in turn is reflected through line 85 to chamber A of derivative relay 49. This will cause an immediate effect on the fuel flow valve 23.

In a similar manner, temperature recording controller 82 is sensitive through line 84 with the outlet temperature in line 16, and is connected with derivative relay 50 through line 86 to effect the positioning of fuel valve 24.

There is one further instrument of major importance and that is the oxygen percentage recording controller 90. This is sensitive to the oxygen conditions in the stack as at 91 through line 92, and the response is superimposed on the derivative relay 59 through line 93.

It will thus be appreciated that as soon as a slight change in temperature of charge outlet 15 or 16, is noted, relays 49 and 50 will immediately begin to reposition the fuel valve 23 or 24. But as long as the rate of correction as a result of minute temperature deviation is equal to the rate at which the flow impulse correction vanishes, essentially straight line control will obtain.

In a similar manner a slight change in oxygen content detected by the oxygen controlling recorder will begin repositioning the stack damper.

During periods of constant flow rate the output of derivative relays 49 and 50 will be identical with the output of the primary controllers 81 and 82. If however there is a change in output of either temperature recording control, there will be a reposition of the stack damper independently of the flow rate. The corrections to the damper position from this source are similarly arranged to vanish with time, but at a rate which will permit the oxygen controlling recorder to maintain essentially straight line control.

The oil heater 10 of the usual refinery is in the nature of a pressure chamber, the air for combustion being controlled effectively by the position of the stack damper 45. No other control of combustion air is thus necessary.

In summary, it will be noted that we have provided simple controls for a multiple coil petroleum or other chemical heater and that uniformity of conversion conditions such as cracking, vaporizing or merely superheating can be readily maintained and changes promptly compensated for. Provision is made for a uniform charge flow by means of the orifice and valve setting.

Fuel flow is controlled by the charge flow and the outlet temperature. In addition, efficient oxygen control is effected by controlling the damper position. Uniformity between the respective streams is also provided by the averaging relay. As a result the uniform processing of streams is automatically accomplished.

Having thus described the invention, what is claimed is:

1. A pneumatically operated control system for a fuel fired heater of a fluid charge, said heater having a charge inlet, a charge outlet, means to introduce a fuel to said heater for combustion therein, temperature responsive means in communication with the charge outlet, an orifice control in the charge inlet and a fuel feed control in the fuel introduction means, said fuel feed control being adapted to maintain a constant fuel feed rate to said heater, said system including a pneumatically operated relay having a valve maintained in a central position by the influence of a fluid pressure source which is balanced by a spring, said relay being interconnected to said temperature responsive means and to said fuel feed control to vary the fuel feed with respect to temperature changes on the charge outlet, said relay having two chambers containing opposed pressure responsive members acting in opposition on said valve, means for feeding impulses due to inlet charge flow changes directly to one of said chambers, and throttle valve means for applying said charge flow impulse to the other of said chambers whereby transient changes in the inlet charge flow rate will produce a relay output impulse to initially vary the fuel flow and then rapidly nullify said charge flow impulse.

2. A pneumatically operated control system as claimed in claim 1 in which the heater has a stack outlet for products of combustion, a damper in said outlet, a combustion gas analyzer in communication with the stack outlet, and a second pneumatically operated relay having a valve maintained in a central position by the influence of a second fluid pressure source which is balanced by a spring, said second relay being interconnected to said gas analyzer and to said damper to vary the damper position with respect to changes in the combustion gas analyzer, said relay also being in communication between the second fluid pressure source and the output impulse of the first mentioned relay whereby transient changes in fuel flow will initially vary the damper position and then be rapidly damped out.

3. A pneumatically operated control system as claimed in claim 2 in which the heater is provided with at least two charge inlets and at least two charge outlets for independent charge streams and each charge stream has the temperature responsive means on the charge outlet and has separate pneumatic relays in communication with said temperature responsive means and the separate fuel introduction means, and an averaging relay interconnected with said separate pneumatic relays and with said second relay whereby the pneumatic pressure corresponding to the average change of fuel rate effected by said separate relays is impressed on the second relay affecting the damper and is immediately damped out.

4. A system for controlling the operation of a heater to maintain the temperature of a medium heated thereby at a constant value comprising, in combination, means for measuring the temperature of the heated medium, means for regulating the supply of fuel to the heater, means for measuring the flow of process medium through the heater, means for regulating the draft through the heater, means for measuring the oxygen content of the gases of combustion, means jointly responsive to said temperature measuring means and said process medium flow measuring means operating said fuel supply regulating means, and means responsive to said oxygen measuring means and to said jointly responsive means operating said draft regulating means.

WARD J. F. O'CONNOR.
FRANK A. ROWEN, Jr.

References Cited in the file of this patent

UNITED STATES PATENTS

| Number | Name | Date |
|---|---|---|
| 1,615,481 | Poole | Jan. 25, 1927 |
| 1,644,123 | Griswold | Oct. 4, 1927 |
| 1,806,597 | De Florez | May 26, 1931 |
| 1,833,153 | Brown | Nov. 24, 1931 |
| 1,893,635 | Poole | Jan. 10, 1933 |
| 1,895,701 | Brown | Jan. 31, 1933 |
| 2,000,235 | Krogh | May 7, 1935 |
| 2,217,636 | Rude | Oct. 8, 1940 |
| 2,217,637 | Junkins | Oct. 8, 1940 |
| 2,217,642 | Luhrs | Oct. 8, 1940 |
| 2,232,219 | Dueringer | Feb. 18, 1941 |
| 2,315,527 | Junkins et al. | Apr. 6, 1943 |
| 2,337,851 | Junkins | Dec. 28, 1943 |
| 2,586,503 | Barnard | Feb. 19, 1952 |

OTHER REFERENCES

Rude et al., "Refined and Natural Gasoline Manufacture," vol. 18, No. 7, pages 255-266, July 1939.